Feb. 11, 1936.  G. G. GILPIN  2,030,748
RAILWAY CAR STRUCTURE
Filed Aug. 16, 1934  9 Sheets-Sheet 1

Inventor:
Garth G. Gilpin
Attorney

Feb. 11, 1936.  G. G. GILPIN  2,030,748
RAILWAY CAR STRUCTURE
Filed Aug. 16, 1934    9 Sheets-Sheet 2

Inventor
Garth G. Gilpin
Attorney

Feb. 11, 1936.                G. G. GILPIN                2,030,748
                          RAILWAY CAR STRUCTURE
                          Filed Aug. 16, 1934           9 Sheets-Sheet 3

Inventor
Garth G. Gilpin
Attorney

Feb. 11, 1936.  G. G. GILPIN  2,030,748
RAILWAY CAR STRUCTURE
Filed Aug. 16, 1934  9 Sheets-Sheet 4

Inventor:
Garth G. Gilpin
Attorney

Feb. 11, 1936.   G. G. GILPIN   2,030,748
RAILWAY CAR STRUCTURE
Filed Aug. 16, 1934   9 Sheets-Sheet 5

Inventor
Garth G. Gilpin
Attorney

Feb. 11, 1936.　　　　G. G. GILPIN　　　　2,030,748
RAILWAY CAR STRUCTURE
Filed Aug. 16, 1934　　　9 Sheets-Sheet 6
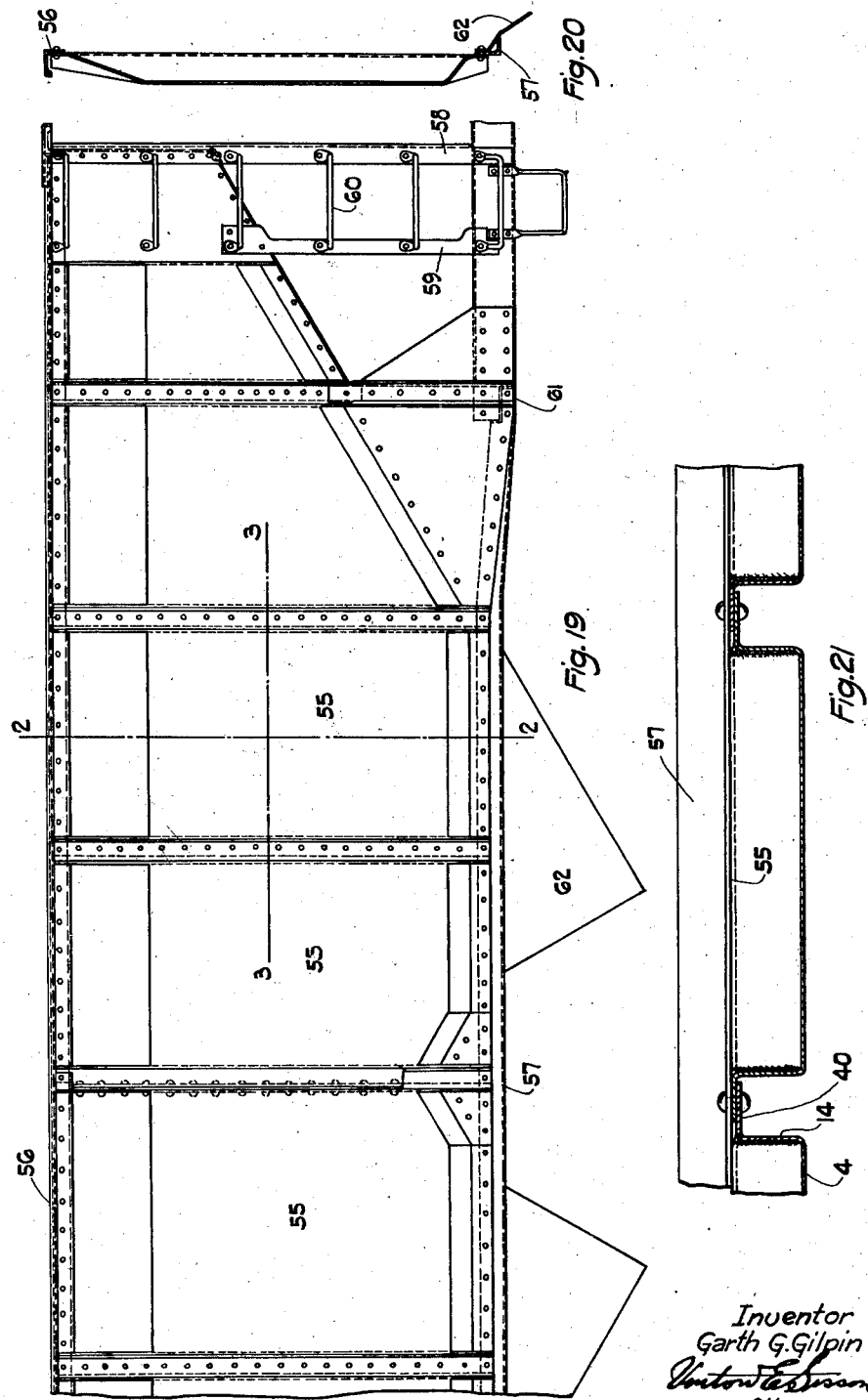
Inventor
Garth G. Gilpin
Attorney Feb. 11, 1936.   G. G. GILPIN   2,030,748
RAILWAY CAR STRUCTURE
Filed Aug. 16, 1934    9 Sheets-Sheet 7
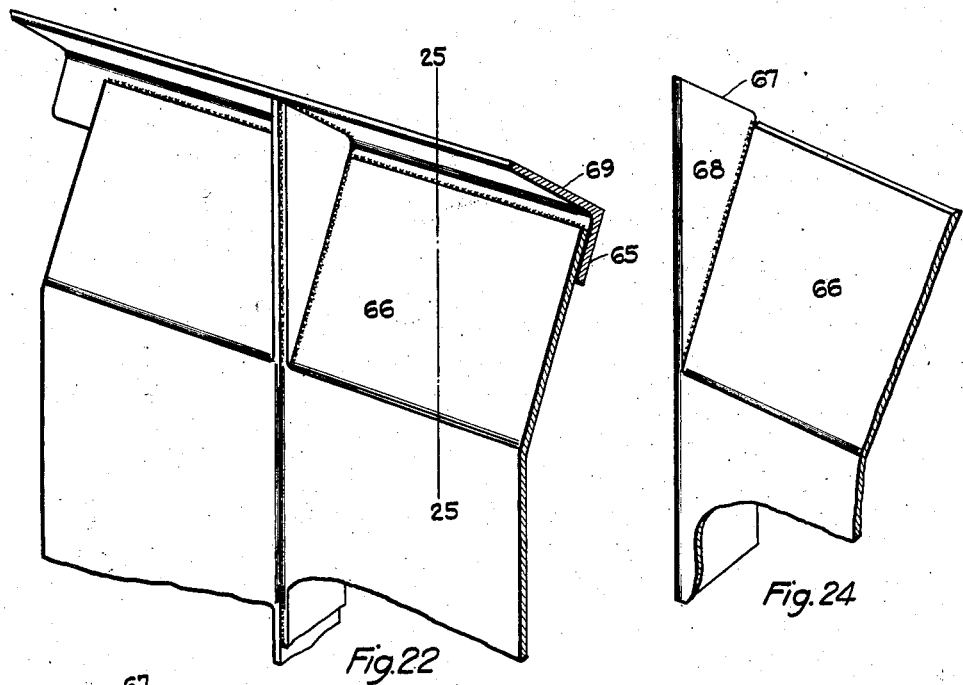
Fig. 22
Fig. 24
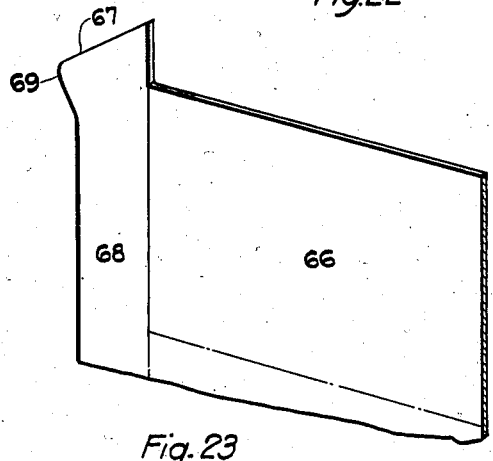
Fig. 23
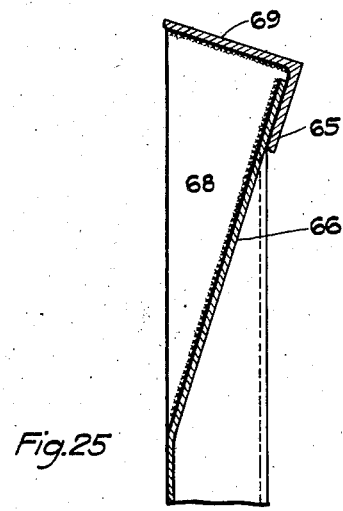
Fig. 25
Inventor:
Garth G. Gilpin
Attorney Feb. 11, 1936. G. G. GILPIN 2,030,748
RAILWAY CAR STRUCTURE
Filed Aug. 16, 1934 9 Sheets-Sheet 8
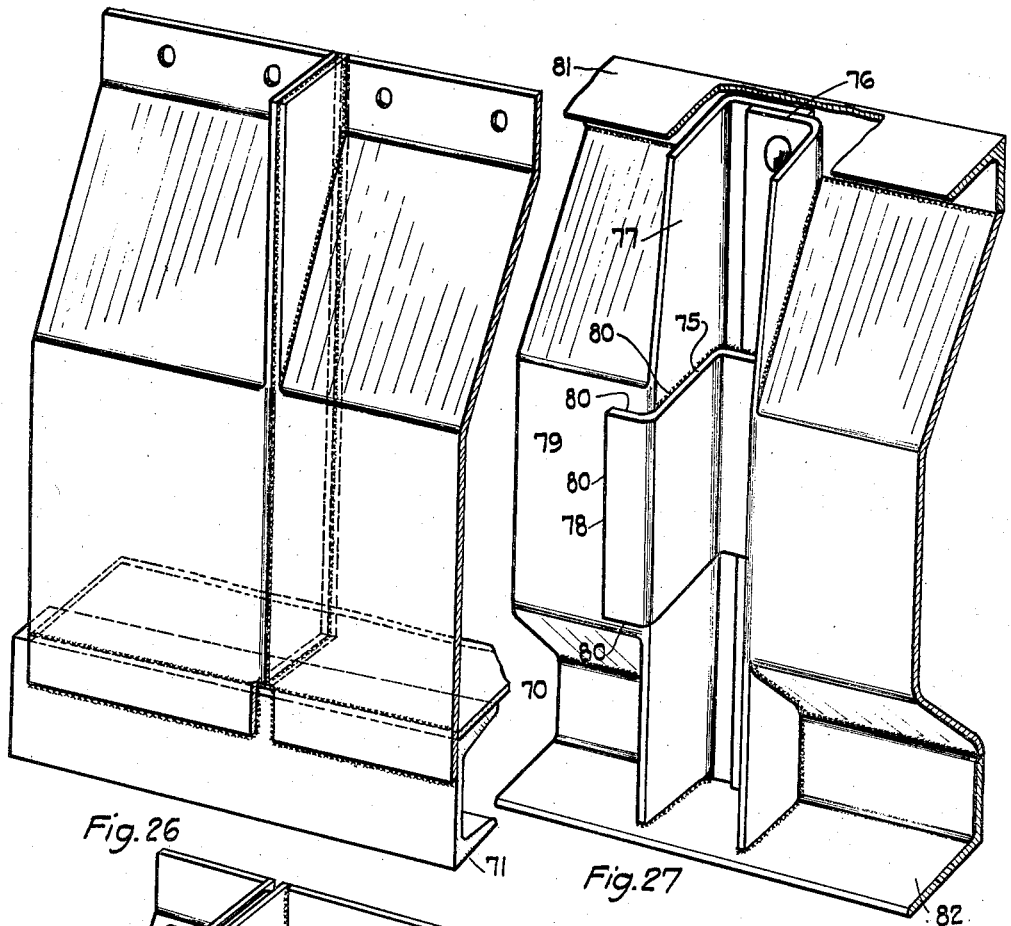
Fig. 26
Fig. 27
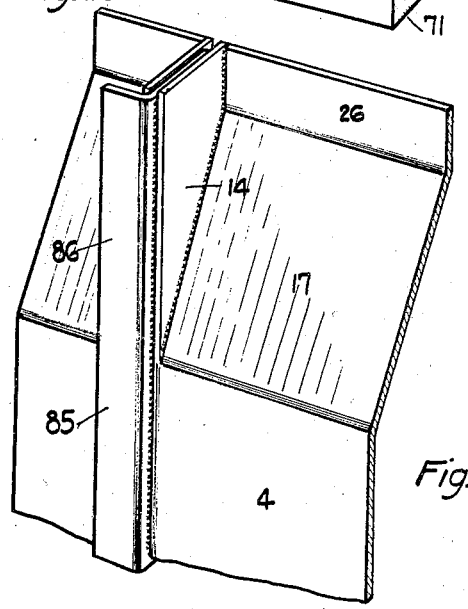
Fig. 28
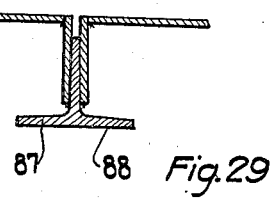
Fig. 29
Inventor
Garth G. Gilpin
Attorney Feb. 11, 1936.                G. G. GILPIN                2,030,748
                          RAILWAY CAR STRUCTURE
                          Filed Aug. 16, 1934          9 Sheets-Sheet 9

Inventor
Garth G. Gilpin
Attorney

Patented Feb. 11, 1936

2,030,748

UNITED STATES PATENT OFFICE 2,030,748

RAILWAY CAR STRUCTURE

Garth G. Gilpin, Riverside, Ill., assignor to Union Metal Products Company, Chicago, Ill., a corporation of Delaware Application August 16, 1934, Serial No. 740,073

24 Claims. (Cl. 105—409)

The invention relates to railway freight cars and more particularly to side and end walls for open top railway cars, such as hopper and gondola cars, though the construction is adaptable for walls of house cars, such as box, automobile and refrigerator cars. The construction is also adaptable for use as roofs, floors, hopper doors and side doors for railway cars. A roof or a floor comes within the meaning of the term "wall" as used in the specification and claims herein.

Railway freight cars are generally designed so that the side walls are girders or trusses to carry part of the weight of the lading and the car itself to the body bolsters which transmit such load to the trucks. Such side walls also retain the load in the car. It is desirable to make the inside horizontal width of the car as wide as possible to increase the cubical capacity of the car but the outside width of the car is limited by tunnels and projections adjacent the track so it becomes imperative to make the side wall as thin horizontally as possible consistent with strength requirements.

Open top railway cars are frequently built with the vertical walls comprising spaced apart upper and lower frame members connected at spaced intervals by vertical posts with panels filling the spaces between the posts and frame members, which construction forms a girder and retaining wall. It has been proposed to bulge the central parts of these panels outwardly to increase the cubical capacity of the car, such as shown in the Hart Patent No. 1,623,591 of April 5, 1927.

One of the objects of my invention is to provide a wall panel for a railway car which provides the maximum inside width of the car consistent with given outside width limitations, which panel is easily made, easily assembled upon the car and which is very light in weight for its strength, and another object is to assemble a plurality of such panels in a railway car so that the marginal portions of adjacent panels are formed and secured together to provide vertical posts between the upper and lower chords of the girder, which posts have adequate strength and yet occupy very little of the loading compartment of the car, thus helping to further increase the cubical capacity of the car.

Another object is to provide a panel having the central part offset from the marginal parts with integral stiffeners along opposite sides for various uses in a railway car.

Another object is to provide a panel of novel construction wherein the body or main portion of the panel is offset relative to the marginal portions for certain advantages pertinent to the particular article for which the panel is used and wherein certain sides of the panel comprise stiffening means which strengthen the offset body portion, form means of attachment of the panel to other parts of the car or to similar panels when associated therewith.

While I have principally shown and described my invention adapted for use in a wall for an open top railway car, it is understood that there are numerous other adaptations of the invention for use in railway cars.

Figure 12:
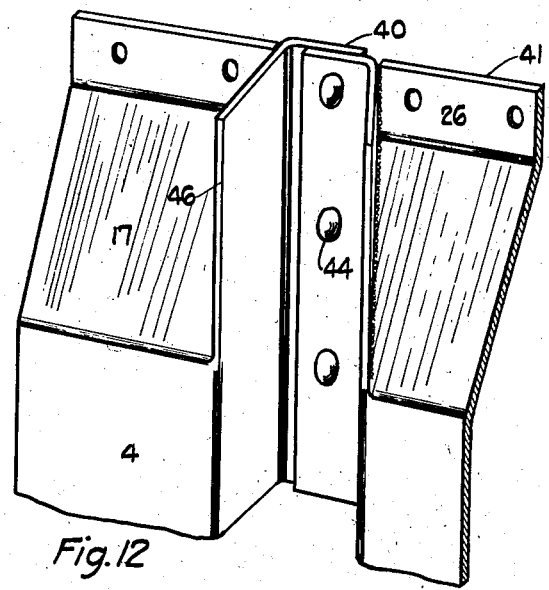
Figure 18:
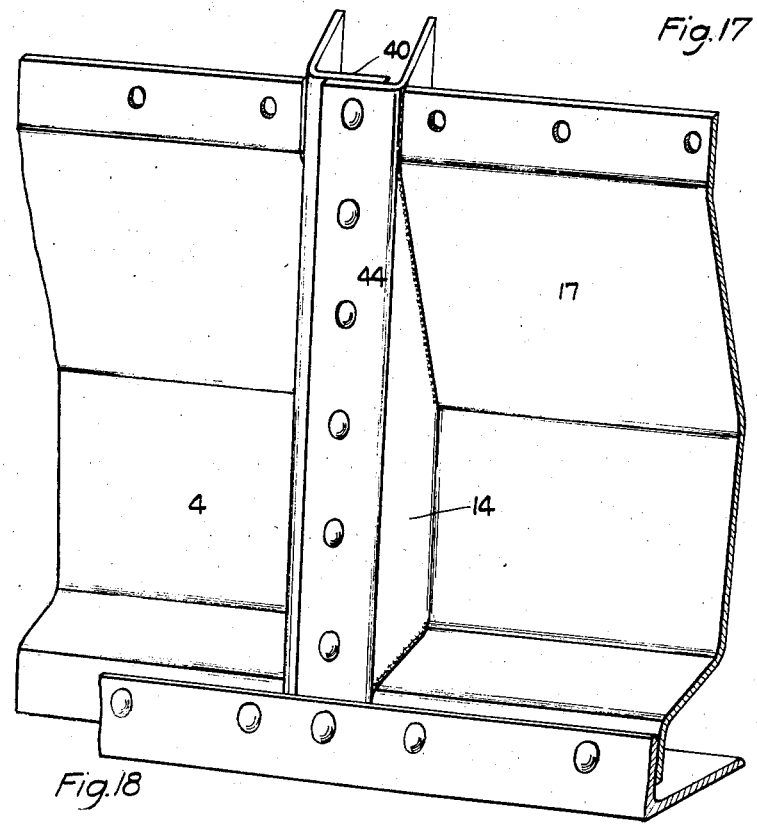

Figs. 12 and 18 inclusive show a modification wherein the webs are provided with outturned flanges.

Figs. 19 to 21 inclusive show a typical application of my improved panels as a side wall of a railway car, wherein Figs. 20 and 21 are sections on lines 20—20 and 21—21, respectively, of Fig. 19.

Figs. 22 to 25 inclusive show a modification wherein the frame member is diagonally disposed.

Fig. 26 shows my invention adapted to a railway gondola car.

Figs. 27, 28 and 29 show a method of applying a reinforcing member between adjacent panels.

Figure 30:
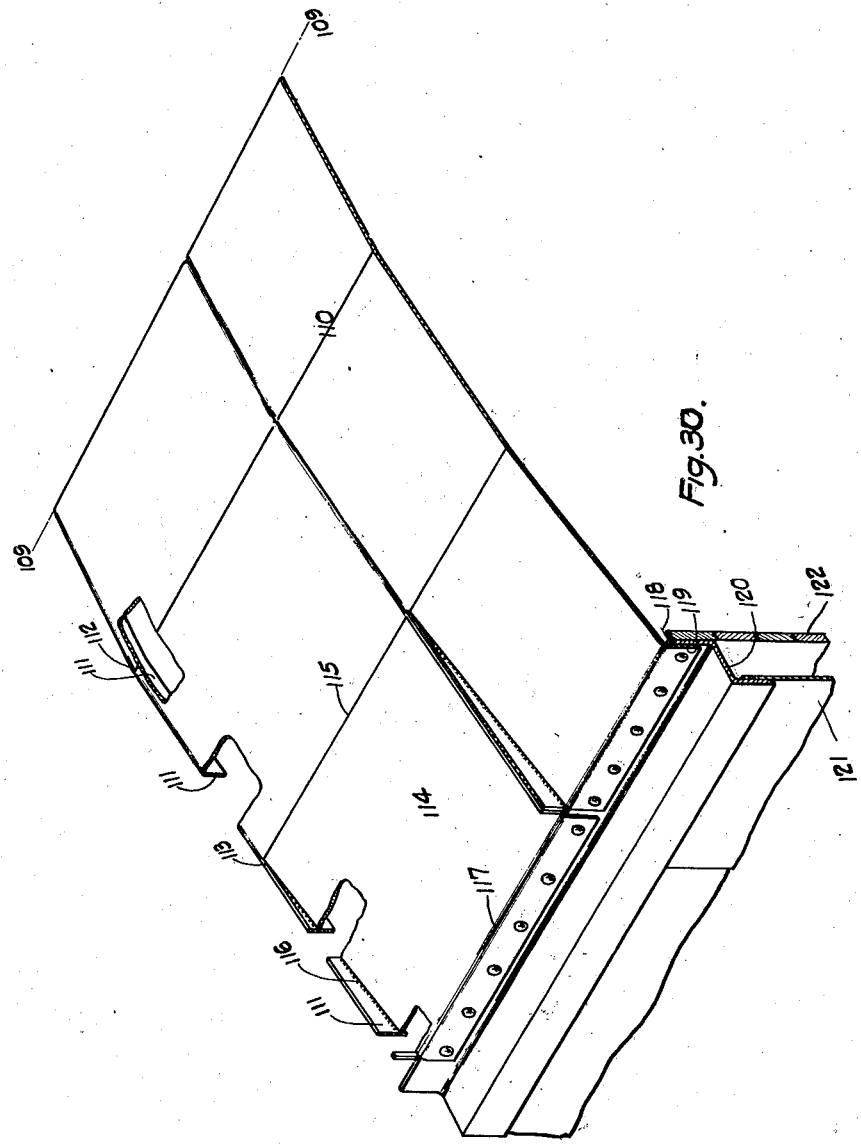

Fig. 30 shows a car roof constructed according to my invention.

In the form of my invention illustrated I have merely shown spaced apart frame members 2—3 and a plurality of my improved panels 4—5 spanning the space therebetween and secured thereto to form the web of the girder and the load retaining means of the car. The upper (2) and lower (3) frame members are the upper and lower chords of the girder and may be the side plate and side sill, respectively, of a house car or may be the top stiffener and lower sill of a hopper or gondola car, or may be the opposite side plates of a roof construction, the marginal stiffeners of a side door, or opposite corner post of an end wall, etc. The panels are formed and secured to the adjacent panels at their vertical margins to form stiffening members 6 between adjacent panels. These stiffening members constitute the stiffeners for the web of the girder; posts for the side wall of the car when considered as a retaining wall and also act as vertical beams to transmit horizontal loads imposed thereon to the frame members. It will be noted that the intermediate portions 17 tend to prevent the stiffening members 6 (or webs 14) from buckling under beam stresses or column stresses.

Figure 3:
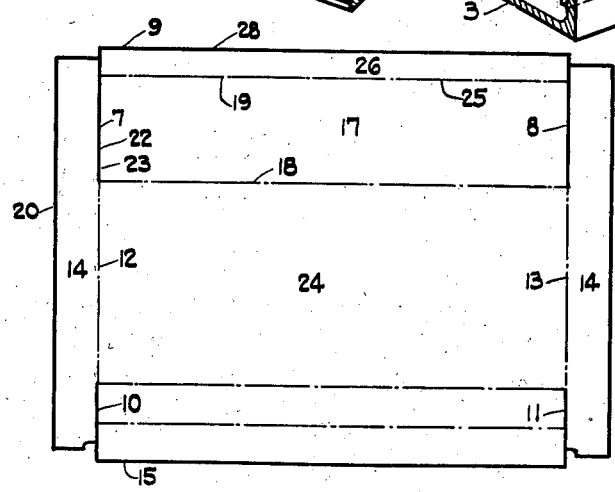
Fig. 3 shows the blank, slits and bending lines of a plate to make the panel shown in Figs. 1 and 2.

My improved wall panel is made from a flat metallic plate which in railway car construction is about 1/8" to 1/4" thick steel plate. The plate is trimmed to a rectangular blank, as shown in Fig. 3, and then spaced apart slits 7—8 are cut therein which extend from one edge 9 of the plate toward the interior thereof. If the plate is to be formed at both ends slits 10 and 11 are also cut into the plate which are aligned with the slits 7 and 8, respectively. The plate is then angularly bent on lines 12—13 substantially parallel with the respective slits thus forming the webs 14, which extend to the edge 9 (or edges 9—15) of the plate.

The intermediate portion 17 of the plate between the slits 7—8 is then bent in the same direction as the webs 14 on a line 18 preferably extending between the ends of the slits. The depth of the bent portion is preferably the same as the depth of the webs 14 so that the upper edge 19 of the intermediate portion 17 is in the same plane as the edge 20 of the webs 14, as shown in Fig. 2.

The edges 22 of the intermediate portion 17 are then welded (at 23) to the sides of the webs 14 so as to form an integral construction therewith whereby the body portion 24, intermediate portion 17 and the webs 14 cooperate to resist the numerous forces imposed thereon and at the same time to retain such fine plastic lading as sand, lime and mine run coal in the car and eliminate pockets to hold moisture and coal dust which causes corrosion. As shown in Fig. 2 the marginal portions 26 overlap the respective frame members 2 and 3 and welded material is applied at the upper edge of frame member 3 to secure it to the offset panel. Likewise welded material is applied at the lower edge of the frame member 2 to secure it to the offset panel. Thus applied the welded material not only secures the respective elements together but also prevents coal dust and/or moisture from getting between the frame members and the offset panel and cause corrosion.

Figures 1, 2:
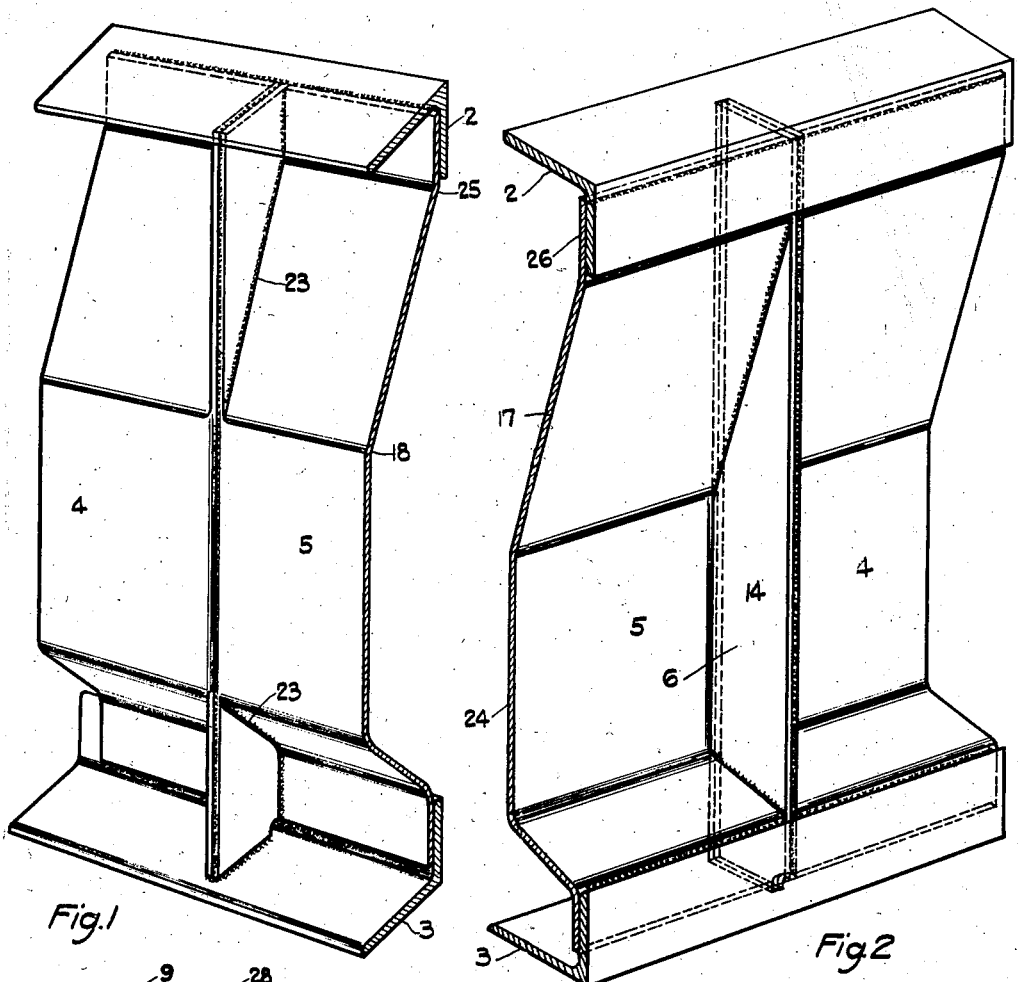
Fig. 1 shows an exterior view of my improved panel attached to spaced apart frame members of a railway car.
Fig. 2 is an interior view of Fig. 1.

It may be desirable, especially when the panel is to be riveted to a frame member 2—3, to reverse bend the intermediate portion 17 of the plate on line 25 to form a marginal portion 26 in a plane parallel to the body portion 24 of the plate, as shown in Figs. 2 and 3, or preferably in the plane of the edges of the webs 4, as shown at 27 in Fig. 1. The length of the web portion 14 of the plate is preferably made a little shorter in the blank than the overall width of the plate, as shown in Fig. 3, so that after the plate is deformed the edges 28 of the webs and the edge 9 of the marginal portion 26 will be in the same plane as shown in Figs. 2 and 3.

Figs. 1, 2 and 3 show the plate slitted and deformed at both ends of the plate which may be desirable in some adaptations of the invention. However, the invention is not so limited.

While I have described the bending of the plate to form the webs 14, intermediate portions 17 and the marginal portions 26 as separate steps in the process of making my improved panel, it is understood that all of these bends may be simultaneously made in dies in a reciprocating press, preferably after the plate has been blanked, but if desired, the slitting, blanking and bending may be done by one movement of a reciprocating press.

The parts may be welded by the electric or acetylene process or may be spot or continuously welded.

Figure 4:
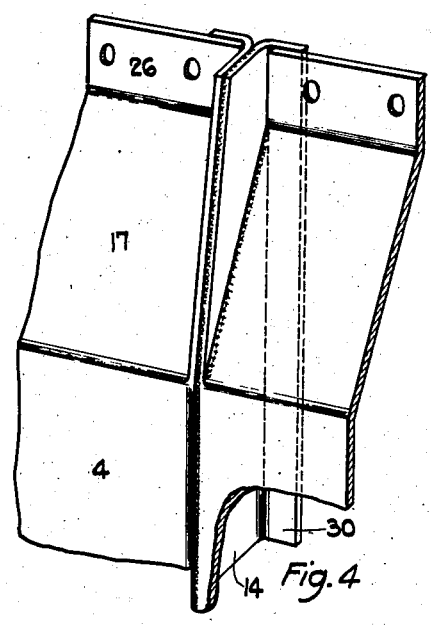
Figs. 4 and 5 show a modification wherein the web is provided with an inturned flange.
Figure 5:
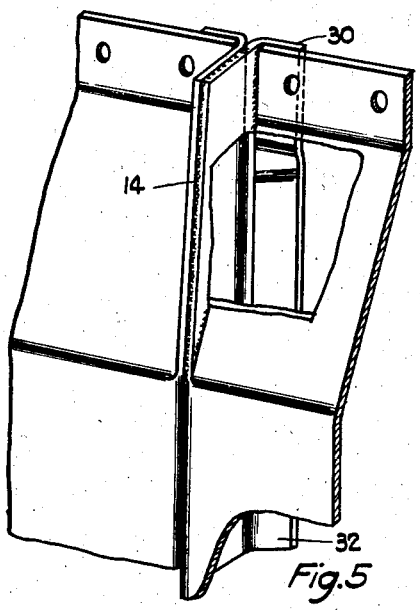

Figs. 4 and 5 show a modification wherein each web 14 is provided with a flange 30 extending toward the body portion 4 of the plate to provide additional stiffness for the webs opposite the body portion of the plate. These flanges are preferably secured to the frame member and to the marginal portion, if one is provided. These flanges may be obliquely positioned, as shown at 32, to prevent them from holding part of the lading when the car is turned upside down in an unloading tipple.

Figure 6:
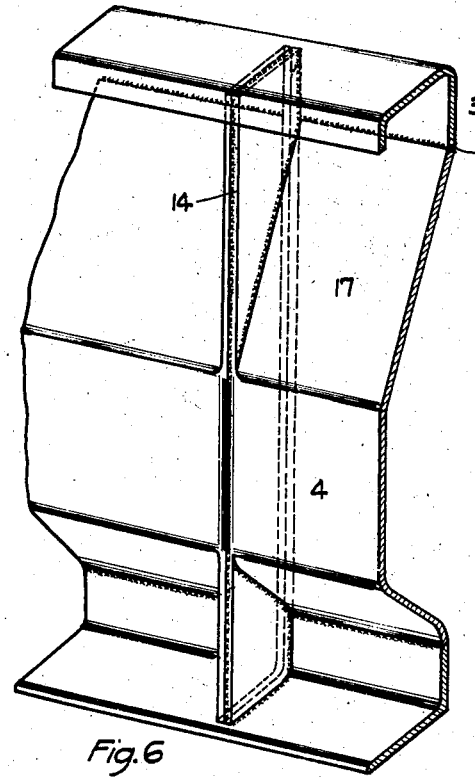
Figs. 6 and 7 show a modification wherein the edge of the oblique intermediate part of the panel is welded to a frame member.
Figure 7:
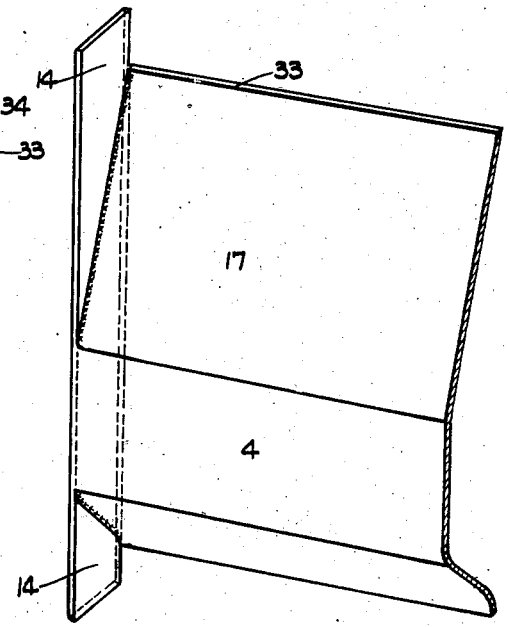

Figs. 6 and 7 show a modification wherein the upper (and also lower if desired) edge 33 of the intermediate portion 17 is welded directly to the lower edge of the frame member 34. In such construction it is desirable to extend the webs 14 beyond the intermediate portion 17 for welding or otherwise attaching to the frame member. If a channel shaped member 34 is used the webs 14 may extend up into the channel for welding thereto. Fig. 7 shows the panel ready for assembling with the frame members and other panels.

Figure 8:
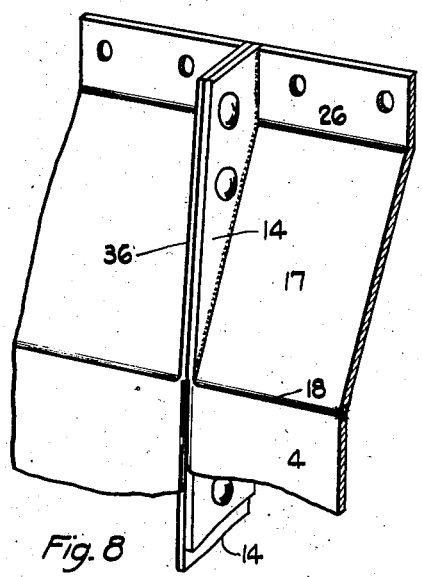
Fig. 8 shows the ends of the webs tapered.
Figure 17:
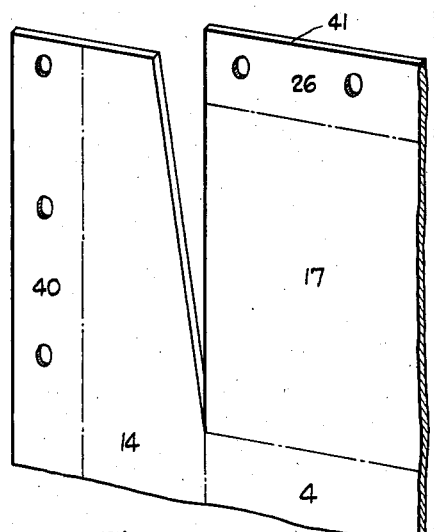

Fig. 8 shows the webs 14 with the outer edge 36 clipped off to form a tapered web beyond the bending line 18 of the intermediate portion 17. The plate is then notched, as shown in Fig. 17.

Figure 9:
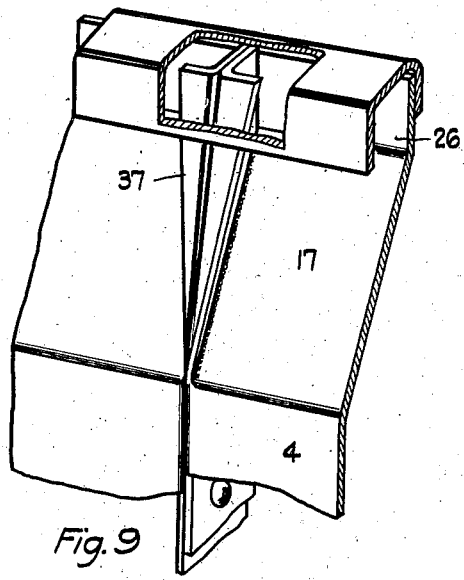
Figs. 9, 10 and 11 show modifications wherein the end portions of the webs are flanged on the outside of the panel.
Figure 10:
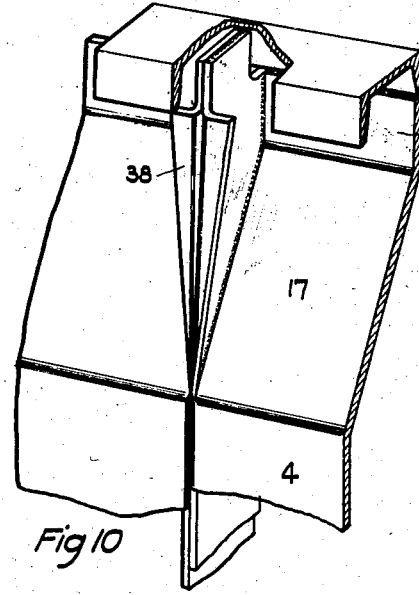
Figure 11:
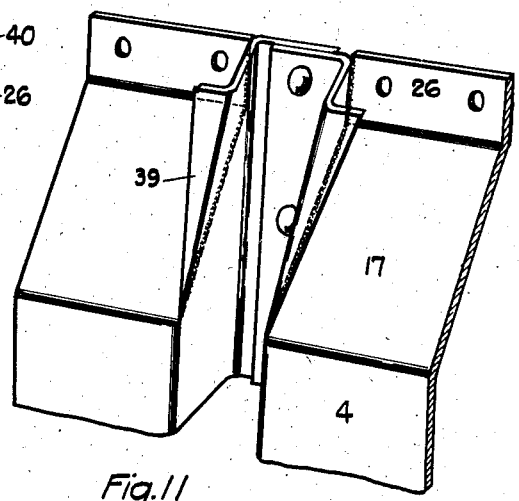

Figs. 9, 10 and 11 show a modification wherein the part of the webs 14 above (and below if desired) the body portion 4 of the plate are provided with lateral flanges 37—38—39 to stiffen them against deflection. These lateral flanges are preferably welded to the adjacent frame member 40.

Figs. 12 to 18 show a modification wherein each web 14 is provided with a flange 40 extending away from the body portion 4 of the plate to provide additional stiffness for the wall between the frame members. The upper edge 41 of the intermediate portion is preferably in the same plane as the edges of the flanges 40 and the marginal portion 26 of the plate (if used) is preferably in the same plane as the flanges 40 for attachment by welding or otherwise to the frame members 42—43. The flanges 40 of adjacent panels are secured together (44) when assembled in a car wall and, if desired, these adjacent flanges may be spaced far enough apart to permit riveting as shown.

Figure 14:
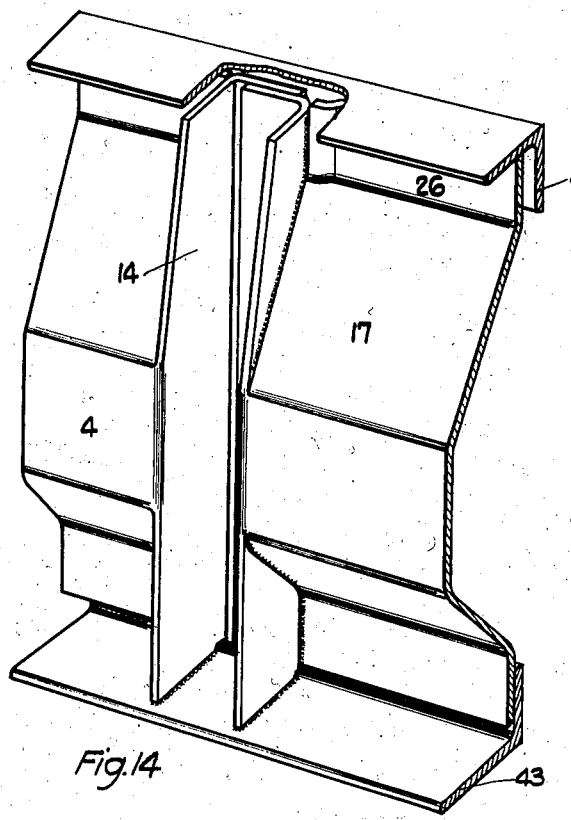

Fig. 14 shows an exterior view and Fig. 18 shows an interior view of this modification.

Figure 13:
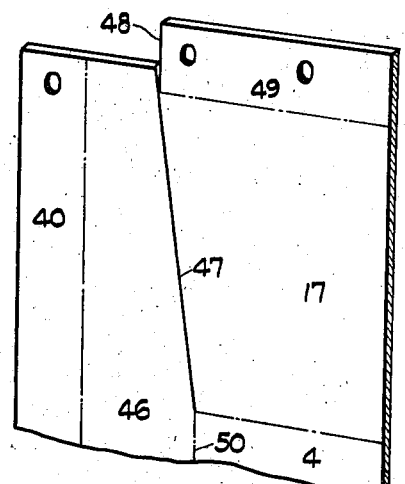

Fig. 12 shows the webs 46 obliquely disposed and Fig. 13 shows a blank plate for such a construction wherein slit 47 is obliquely disposed and the edge 48 of the marginal part 46 is clipped to be parallel with the bending line 50 so that it will fit against the side of the web 46 when the plate is deformed and may be welded thereto.

Figure 15:
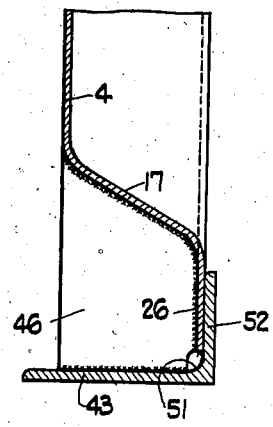
Figure 16:
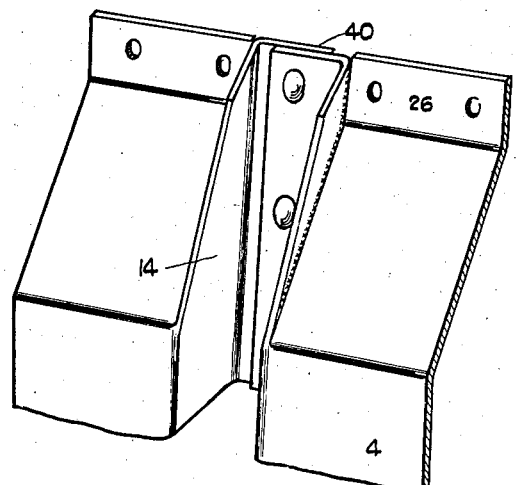

Fig. 15 shows how the webs 46 extend beyond the marginal portion 26 to avoid the fillet 51 of the frame member 52.

Figs. 19, 20 and 21 show an adaptation of the modification of my invention shown in Figs. 12 to 18 inclusive to a railway hopper car wherein a plurality of my panels 55 are secured together at their vertical margins and to the upper 56 and lower 57 chords of the car. The corner post 58 and the upright 59 form stiles for the ladder 60. The bolster is at 61. Numeral 62 is the hopper side sheet.

Figs. 22 to 25 inclusive show a modification wherein the frame member is positioned with the depending arm 65 diagonally disposed and parallel with and secured to the intermediate portion 66 of the plate to which it is secured by riveting or otherwise. The top edges 67 of the webs 68 are welded to the other arm 69 of the frame member. Fig. 23 shows the blank of the plate before being deformed and Fig. 24 shows the completed panel. The web may be rounded at 69 to fit the fillet of the frame member if desired.

Fig. 26 shows a typical application to a car wherein the slit and bending process or construction is applied at only one end of the plate. This figure 26 shows a gondola car wherein 70 is the floor and 71 the side sill.

Figs. 27, 28 and 29 show modifications wherein the middle parts of the posts or stiffeners are reinforced by a separate member. In Fig. 27 this member 75 is secured to the overlapping flanges 76 and preferably is close to the web 77 and is provided with a flange 78 which is close to the body 79 of the panel. The member 75 is preferably sealed preferably by welding at its edges 80 to prevent the entrance of moisture. A coat of car cement or heavy paint is preferably applied to the web 77 before the reinforcing member 75 is put in place. In large cars, and if the stakes are spaced far apart, it may be desirable to extend the reinforcing member 75 to the upper (81) and lower (82) chords and perhaps secure them thereto.

Fig. 28 shows how a reinforcing member 85 would be applied to the construction of Figs. 1 and 2. The member 85 is placed between the webs 14 of adjacent wall panels and provided with a flange 86 (or two opposed flanges 87—88 forming a T section, as shown in Fig. 29). The edges of the panel and reinforcing member are preferably sealed by welding.

Fig. 30 shows a modification of the invention as adapted to a roof of a railway car. In this drawing line 109 is the longitudinal center line of the car. The roof is preferably flat between lines 109 and 110 and on line 110 both the body portion of the plate and the web 111 are bent at 112 forming a sloping roof. The plate is split from its edge into 113 and the intermediate portion 114 of the plate is bent downwardly along the line 115 so that the web or flange 111 is partially inside of the car and partially outside of the car. The intermediate portion 114 of the plate is welded to the web or flange 111 along line 116 as described heretofore for other modifications of this invention. By this arrangement a greater slope is obtained in the roof between lines 115 and 117 and a greater free inside height of the car is obtained at line 118; in other words, a very thin roof (vertically speaking) is obtained. The sheet may be provided with a flange 119 for attachment to the side plate 120 if desired. Numeral 121 is the outside sheathing and 122 is the inside lining.

The accompanying drawings illustrate the preferred form of the invention, though it is to be understood that the invention is not limited to the exact details of construction shown and described, as it is obvious that various modifications thereof, within the scope of the claims, will occur to persons skilled in the art.

I claim:

1. In a railway car wall, the combination of a frame member, and an offset panel, said offset panel comprising a metallic plate having a body portion, spaced apart slits in said plate extending from one edge of the plate, webs formed by bending the plate on lines substantially in alignment with said slits, said webs extending substantially to said edge of the plate with the intermediate portion of the plate between the slits bent in the same direction as the webs and the side edges of said intermediate portion being welded to the sides of the webs, said webs being secured to said frame member.

2. In a railway car wall, the combination of a frame member, and an offset panel, said offset panel comprising a metallic plate having a body portion, spaced apart slits in said plate extending from one edge of the plate, webs formed by bending the plate on lines substantially in alignment with said slits, said webs extending substantially to said edge of the plate with the intermediate portion of the plate between the slits bent in the same direction as the webs with the edge of said intermediate portion in the plane of the edges of said webs and the side edges of said intermediate portion being welded to the sides of the webs, said webs and the edge of said intermediate portion being secured to said frame member.

3. In a railway car wall, the combination of a frame member, and an offset panel, said offset panel comprising a metallic plate having a body portion, spaced apart slits in said plate extending from one edge of the plate, webs formed by bending the plate on lines substantially in alignment with said slits, said webs extending substantially to said edge of the plate with the intermediate portion of the plate between the slits bent in the same direction as the webs, said intermediate portion being reversely bent to form a marginal portion in a plane parallel to the body portion of the plate and the side edges of said intermediate portion and the side edges of said marginal portion being welded to the sides of the webs, said webs and said marginal portion being secured to said frame member.

4. In a railway car wall, the combination of a frame member, and an offset panel, said offset panel comprising a metallic plate having a body portion, spaced apart slits in said plate extending from one edge of the plate, webs formed by bending the plate on lines substantially in alignment with said slits, said webs extending substantially to said edge of the plate with the intermediate portion of the plate between the slits bent in the same direction as the webs, said intermediate portion being reversely bent to form a marginal portion in the plane of the edges of said webs and the side edges of said intermediate portion and the side edges of said marginal portion being welded to the sides of the webs, said webs and said marginal portion being secured to said frame member.

5. In a railway car wall, the combination of a frame member and an offset panel, said offset panel comprising a metallic plate having a body portion, spaced apart slits in said plate extending from one edge of the plate, webs formed by bending the plate on lines substantially in alignment with said slits, said webs extending substantially to said edge of the plate with the intermediate portion of the plate between the slits bent in the same direction as the webs and the side edges of said intermediate portion being welded to the sides of the webs, each of said webs formed with a lateral flange substantially parallel to the body of the plate, said flange being secured to said frame member.

6. In a railway car wall, the combination of a frame member and an offset panel, said offset panel comprising a metallic plate having a body portion, spaced apart slits in said plate extending from one edge of the plate, webs formed by bending the plate on lines substantially in alignment with said slits, said webs extending substantially to said edge of the plate with the intermediate portion of the plate between the slits bent in the same direction as the webs and the side edges of said intermediate portion being welded to the sides of the webs, each of said webs formed with a lateral flange projecting away from the body of the plate and substantially parallel thereto, said flange being secured to said frame member.

7. In a railway car wall, the combination of a frame member and an offset panel, said offset panel comprising a metallic plate having a body portion, spaced apart slits in said plate extending from one edge of the plate, webs formed by bending the plate on lines substantially in alignment with said slits, said webs extending substantially to said edge of the plate with the intermediate portion of the plate between the slits bent in the same direction as the webs and the side edges of said intermediate portion being welded to the sides of the webs, each of said webs formed with a lateral flange substantially parallel to the body of the plate and in the plane of the edge of said intermediate portion, said flange being secured to said frame member.

8. In a railway car wall, the combination of a frame member and an offset panel, said offset panel comprising a metallic plate having a body portion, spaced apart slits in said plate extending from one edge of the plate, webs formed by bending the plate on lines substantially in alignment with said slits, said webs extending substantially to said edge of the plate with the intermediate portion of the plate between the slits bent in the same direction as the webs, said intermediate portion being reversely bent to form a marginal portion in a plane parallel to the body portion of the plate and the side edges of said intermediate portion and the side edges of said marginal portion being welded to the sides of the webs, each of said webs formed with a lateral flange substantially parallel to the body of the plate and in the plane of said marginal portion, said flange being secured to said frame member.

9. An offset panel for use in a railway car comprising a metallic plate having a body portion, spaced apart slits in said plate extending from one edge of the plate, webs formed by bending the plate on lines substantially in alignment with said slits, said webs extending substantially to said edge of the plate with the intermediate portion of the plate between the slits bent in the same direction as the webs and the side edges of said intermediate portion being welded to the sides of the webs in combination with a similarly formed panel with the webs of adjacent panels secured together to form stiffeners between adjacent panels.

10. An offset panel for use in a railway car comprising a metallic plate having a body portion, spaced apart slits in said plate extending from one edge of the plate, webs formed by bending the plate on lines substantially in alignment with said slits, said webs extending substantially to said edge of the plate with the intermediate portion of the plate between the slits bent in the same direction as the webs and the side edges of said intermediate portion being welded to the sides of the webs, each of said webs formed with a lateral flange substantially parallel to the body of the plate in combination with a similarly formed panel with the flanges of adjacent webs secured together to form stiffeners between adjacent panels.

11. An offset panel for use in a railway car comprising a metallic plate having a body portion, spaced apart slits in said plate extending from one edge of the plate, webs formed by bending the plate on lines substantially in alignment with said slits, said webs extending substantially to said edge of the plate with the intermediate portion of the plate between the slits bent in the same direction as the webs and the side edges of said intermediate portion being welded to the sides of the webs in combination with a frame member and a similarly formed panel with the webs of adjacent panels secured together and to the frame member to form stiffeners between adjacent panels which transmit forces imposed thereon to said frame member.

12. An offset panel for use in a railway car comprising a metallic plate having a body portion, spaced apart slits in said plate extending from one edge of the plate, webs formed by bending the plate on lines substantially in alignment with said slits, said webs extending substantially to said edge of the plate with the intermediate portion of the plate between the slits bent in the same direction as the webs and the side edges of said intermediate portion being welded to the sides of the webs, each of said webs formed with a lateral flange projecting away from the body of the plate and substantially parallel thereto in combination with a frame member and a similarly formed panel with the flanges of adjacent webs secured together and to the frame member to form stiffeners between adjacent panels which transmit forces imposed thereon to said frame member.

13. An offset panel for use in a railway car comprising a metallic plate having a body portion, spaced apart slits in said plate extending from one edge of the plate, webs formed by bending the plate on lines substantially in alignment with said slits, said webs extending substantially to said edge of the plate with the intermediate portion of the plate between the slits bent in the same direction as the webs and the side edges of said intermediate portion being welded to the sides of the webs in combination with a frame member and a similarly formed panel with the webs of adjacent panels secured together and to the frame member to form stiffeners between adjacent panels which transmit forces imposed thereon to said frame member, said intermediate portion being secured to said frame member.

14. An offset panel for use in a railway car comprising a metallic plate having a body portion, spaced apart slits in said plate extending from one edge of the plate, webs formed by bending the plate on lines substantially in alignment with said slits, said webs extending substantially to said edge of the plate with the intermediate portion of the plate between the slits bent in the same direction as the webs and the side edges of said intermediate portion being welded to the sides of the webs in combination with a frame member and a similarly formed panel with the webs of adjacent panels secured together to form stiffeners between adjacent panels which overlap said frame member, said intermediate portion being secured to said frame member.

15. An offset panel for use in a railway car comprising a metallic plate having a body portion, spaced apart slits in said plate extending from one edge of the plate, webs formed by bending the plate on lines substantially in alignment with said slits, said webs extending substantially to said edge of the plate with the intermediate portion of the plate between the slits bent in the same direction as the webs and the side edges of said intermediate portion being welded to the sides of the webs, each of said webs formed with a lateral flange projecting away from the body of the plate and substantially parallel thereto in combination with a frame member and a similarly formed panel with the flanges of adjacent webs overlapping said frame member and secured thereto, said intermediate portion being secured to said frame member.

16. An offset panel for use in a railway car comprising a metallic plate having a body portion, spaced apart slits in said plate extending from one edge of the plate, webs formed by bending the plate on lines substantially in alignment with said slits, said webs extending substantially to said edge of the plate with the intermediate portion of the plate between the slits bent in the same direction as the webs and the side edges of said intermediate portion being welded to the sides of the webs, each of said webs formed with a lateral flange projecting away from the body of the plate and substantially parallel thereto in combination with a frame member provided with horizontal and vertical arms, said flanges overlapping and secured to said vertical arm, said webs secured to said horizontal arm and said intermediate portion being secured to said frame member.

17. An offset panel for use in a railway car comprising a metallic plate having a body portion, spaced apart pairs of aligned slits extending from opposite ends of the plate toward the interior thereof, webs formed by bending the plate on lines substantially in alignment with each pair of slits with the intermediate portions of the plate between the respective slits bent in the same direction as the webs and the side edges of the intermediate portions being welded to the sides of the webs in combination with spaced apart frame members, each of said webs overlapping both of said frame members and secured thereto and each of said intermediate portions being secured to an adjacent frame member.

18. An offset panel for use in a railway car comprising a metallic plate having a body portion, spaced apart pairs of aligned slits extending from opposite ends of the plate toward the interior thereof, webs formed by bending the plate on lines substantially in alignment with each pair of slits with the intermediate portions of the plate between the respective slits bent in the same direction as the webs, said intermediate portions being reversely bent to form marginal portions and the side edges of the intermediate portions and the side edges of the marginal portions being welded to the sides of the webs in combination with spaced apart frame members, each of said webs spanning the distance between said frame members and secured thereto and each of said marginal portions being secured to an adjacent frame member.

19. A wall for a railway car comprising spaced apart frame members and a plurality of panels, each of said panels comprising a metallic plate having a body portion provided with pairs of aligned slits extending from opposite ends of the plate toward the interior thereof, webs formed by bending the plate on lines substantially in alignment with each pair of slits with the intermediate portions of the plate between the respective slits bent in the same direction as the webs, the side edges of the intermediate portions being welded to the sides of the web, the ends of said intermediate portions being attached to the adjacent frame member, said webs spanning the distance between said frame members and secured thereto, said body portion being positioned adjacent the outer surface of the wall whereby the cubical capacity of the car is increased.

20. A wall for a railway car comprising spaced apart frame members and a plurality of panels, each of said panels comprising a metallic plate having a body portion provided with pairs of aligned slits extending from opposite ends of the plate toward the interior thereof, webs formed by bending the plate on lines substantially in alignment with each pair of slits with the intermediate portions of the plate between the respective slits bent in the same direction as the webs, said intermediate portions being reversely bent to form marginal portions, the side edges of the intermediate portions and the side edges of the marginal portions being welded to the sides of the webs, the ends of said marginal portions being attached to the adjacent frame member, said webs spanning the distance between said frame members and secured thereto, said body portion being positioned adjacent the outer surface of the walls whereby the cubical capacity of the car is increased.

21. A wall for a railway car comprising spaced apart frame members and a plurality of panels, each of said panels comprising a metallic plate having a body portion provided with pairs of aligned slits extending from opposite ends of the plate toward the interior thereof, webs formed by bending the plate on lines substantially in alignment with each pair of slits with the intermediate portions of the plate between the respective slits bent in the same direction as the webs, said intermediate portions being reversely bent to form marginal portions, the side edges of the intermediate portions and the side edges of the marginal portions being welded to the sides of the webs, said webs spanning the distance between said frame members and secured thereto, each of said marginal portions overlapping the adjacent frame member with welded material attaching the edges of the respective frame members to the marginal portions so as to prevent coal dust from getting between the respective marginal portions and frame members.

22. In a railway car wall, the combination of a frame member and an offset panel comprising a metallic plate having a body portion, spaced apart slits in said plate extending from one edge of the plate, webs formed by bending the plate on lines substantially in alignment with said slits with the intermediate portion of the plate between the slits bent in the same direction as the webs and the side edges of said intermediate portion being welded to the webs, parts of the portions of the webs between the body portion and the edge of the plate provided with flanges, said webs and said flanges being secured to said frame member.

23. In a railway car wall, the combination of a frame member and an offset panel comprising a metallic plate having a body portion, spaced apart slits in said plate extending from one edge of the plate, webs formed by bending the plate on lines substantially in alignment with said slits with the intermediate portion of the plate between the slits bent in the same direction as the webs and the side edges of said intermediate portion being welded to the webs, parts of the portions of the webs between the body portion and the edge of the plate provided with flanges, said webs being secured to said frame member.

24. In a railway car wall, the combination of a frame member and an offset panel comprising a metallic plate having a body portion, spaced apart slits in said plate extending from one edge of the plate, webs formed by bending the plate on lines substantially in alignment with said slits with the intermediate portion of the plate between the slits bent in the same direction as the webs and the side edges of said intermediate portion being welded to the webs, parts of the portions of the webs between the body portion and the edge of the plate provided with flanges increasing in width from the body portion toward the edge of the plate, said webs being secured to said frame member.

GARTH G. GILPIN.